Aug. 15, 1939  C. T. DE GRACE  2,169,462
HYDRAULIC BRAKE SYSTEM
Filed March 29, 1938
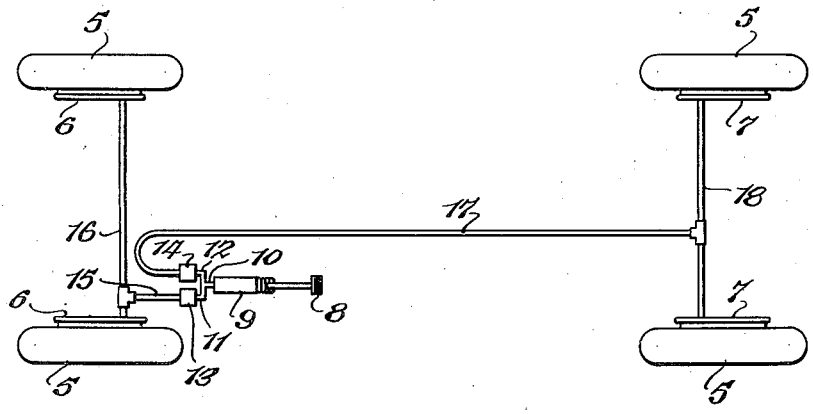
Fig. 1.
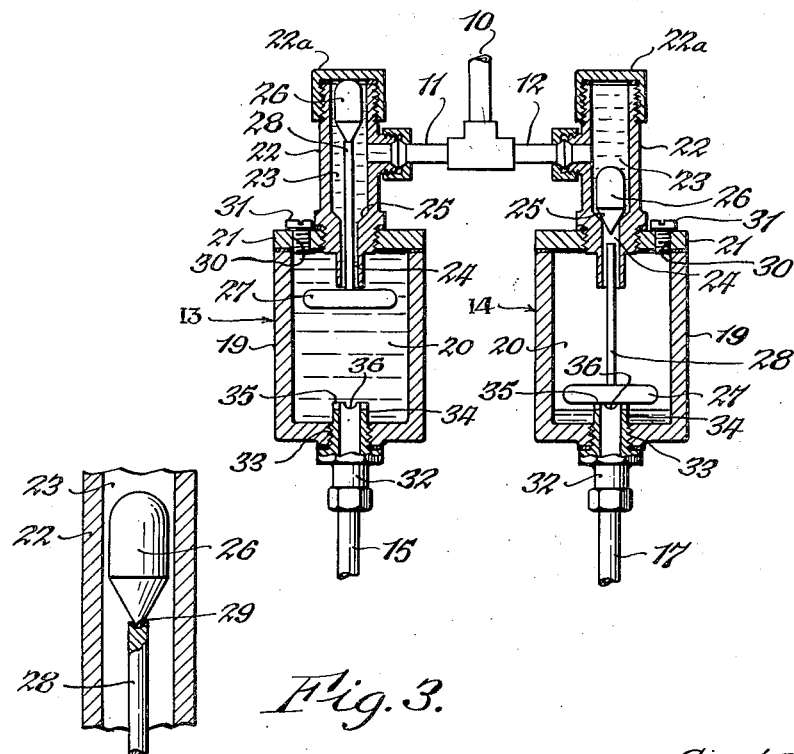
Fig. 2.
Fig. 3.
INVENTOR
Carl T. DeGrace
BY
John S. Powers
ATTORNEY Patented Aug. 15, 1939

2,169,462

UNITED STATES PATENT OFFICE 2,169,462

HYDRAULIC BRAKE SYSTEM

Carl T. De Grace, Buffalo, N. Y.

Application March 29, 1938, Serial No. 198,658

7 Claims. (Cl. 303—84)

This invention relates to improvements in hydraulic brake systems for motor vehicles and more particularly is concerned with a system of the kind wherein provision is made for preventing all of the braking units from being rendered inoperative in the event that a leak occurs in a line leading to one of them.

One object of the invention is to provide a system which is so designed that gradual depletion of the fluid medium in the operative part of the system is prevented when once the supply of the said medium to the line containing the leak is cut off.

A further object is to provide for facility in filling and draining the system and in bleeding off air.

A still further object is to provide a novel design and arrangement of the parts of the system whereby simplicity and economy in construction are obtained.

The invention is illustrated in the accompanying drawing in which:

Figure 1 is a diagrammatic view of the system as applied to an automobile;

Figure 2 is an enlarged sectional view through the fluid control devices; and

Figure 3 is an enlarged detail section taken along line 3—3 of Figure 2.

The system is illustrated in connection with an automobile which is sufficiently indicated for the purpose in view by a showing of the wheels 5 and the front and rear brakes 6 and 7, respectively. The pedal 8 for actuating the brakes is associated with a master cylinder 9 in conventional manner. The said cylinder is connected by a main pipe 10 and branch pipes 11 and 12 with fluid control devices 13 and 14, the device 13 being connected by tubes 15 and 16 with the front brakes 6 while the device 14 is connected by tubes 17 and 18 with the rear brakes 7.

The fluid control devices 13 and 14 are similar in design. Each, as illustrated, includes a casing 19 which provides a reservoir 20 and which is closed at its top by a cap piece 21. Barrels 22 which are carried by the said cap-pieces provide inlet chambers 23 to which the fluid medium is supplied by the branch pipes 11 and 12, the lower ends of the said barrels extending into the reservoirs 20 and being formed to provide passages 24. The barrels are closed by caps 22a. The bottoms of the chambers 23 converge toward the passages 24 to provide seats 25 for valves 26. The latter are normally held above the inlets to the chambers 23 by floats 27 which are located in the reservoirs 20 and which carry stems 28, the said stems extending upwardly through the passages 24 and being formed with cup-shaped depressions 29 (Figure 3) in which the ends of the valves fit. In this connection it will be noted that the passages 24 are substantially larger in cross-section than the stems 28. Free flow of the fluid medium between the inlet chambers and the reservoirs is thus insured. Filling openings 30 which are formed in the cap-pieces 21 are closed by threaded plugs 31.

The connection of the tubes 15 and 17 to the fluid control devices is effected by fittings 32 which are screwed into threaded openings 33 formed in the bottom walls of the casings 19. The said fittings are formed with sleeve-like extensions 34 which project into the reservoirs 20 to provide seats 35 for the floats 27. The top edges of the extensions 34 are cut away as indicated at 36 to provide passages through which the fluid medium may flow into the tubes 15 and 17 when the floats are supported upon the said seats.

In the normal operation of the system the reservoirs 20 are maintained filled with the fluid medium by which the brakes are actuated and the floats 27 remain at the upper limits of their ranges of movement to hold the valves 26 above the inlets to the chambers 23. Under such conditions the fluid medium is free to flow through either of the chambers 23 into either of the reservoirs 20. Uniform application of the front and rear brakes is thus insured. If, however, a leak should occur in one of the lines leading to the brakes, the fluid medium in the reservoir with which the said line is connected will flow out of the said reservoir as illustrated by the device 14 (Figure 2). The float, therefore, lowers in the reservoir to permit the associated valve to move into engagement with its seat and thereby prevent further flow of the fluid medium into the reservoir, the float coming to rest upon its seat, as illustrated.

From the foregoing it will be apparent that when one of the valves 26 is seated in the manner described the flow of the fluid medium into the reservoir with which the leaking line is connected is prevented. Thus while two of the brakes (the rear brakes in the embodiment illustrated) may be rendered inoperative, the remaining two brakes function in the usual manner. In this connection it will be noted that when one of the valves 26 closes subsequent actuation of the brake pedal causes a pressure to be built up in the chamber in which it is located, thereby forcing it tightly against its seat to seal the passage which communicates with the associated reservoir. Depletion of the fluid medium in the operative part of the system is thus prevented.

When it is desired to fill the system the threaded plugs 31 are removed and the fluid introduced into the reservoirs 20 through the openings 30, the valves 26 being moved to positions above the inlets to the chambers 23 as the fluid medium rises in the reservoirs. When the latter are filled the openings 30 are closed by the plugs 31. The caps 22a are then loosened, if this has not been done previously, and the brake pedal actuated to place the fluid medium in the system under pressure. Any air remaining in the system at this time will thus escape through the barrels 22, the said caps being tightened upon completion of this operation. The necessity for bleeding the air at each brake is thus avoided. If desired the system may be filled through the barrels 22. In this case the valves 26 are temporarily removed and the caps 22a replaced. The entire system may then be filled through the master cylinder, after which operation the valves 26 are replaced and the air bled off in the manner described.

It will be noted that when the floats 27 rest upon the seats 35 they do not prevent flow of the fluid medium into the tubes 15 and 17. The said floats, therefore, will not interfere with the filling or the draining of the system when they occupy such positions, the cut-away portions in the seats providing passages through which the fluid medium may pass when the floats are supported upon them. Filling and draining of the system is thus facilitated.

The control devices 13 and 14 are illustrated as separate units. It is understood, of course, that this is intended by way of example only and that if desired the two devices may be embodied in a single unitary structure.

I claim as my invention:

1. A hydraulic brake system for a motor vehicle including a master cylinder, separate lines leading to the front and rear brakes of said vehicle, a pair of control devices, each having an inlet chamber which communicates with said master cylinder and a reservoir to which one of said lines is connected, passages connecting said inlet chambers and reservoirs, valves in said inlet chambers for cutting off communication between the latter and said reservoirs and floats in said reservoirs which are operative when the latter are filled to hold said valves in positions in which they permit flow of the fluid medium through said passages.

2. A hydraulic brake system for a motor vehicle including a master cylinder, separate lines leading to the front and rear brakes of said vehicle, a pair of control devices, each having an inlet chamber which communicates with said master cylinder and a reservoir to which one of said lines is connected, passages connecting said inlet chambers and reservoirs, valves in said inlet chambers for cutting off communication between the latter and said reservoirs and floats in said reservoirs, said floats carrying stems which extend through said passages into co-operating relation with said valves and being operative when said reservoirs are filled to hold said valves in positions in which they permit flow of the fluid medium through said passages.

3. A hydraulic brake system for a motor vehicle including a master cylinder, separate lines leading to the front and rear brakes of said vehicle, a pair of control devices, each having an inlet chamber which communicates with said master cylinder and a reservoir to which one of said lines is connected, passages connecting said inlet chambers and reservoirs, valves for cutting off communication between said inlet chambers and reservoirs, floats in said reservoirs which are operative when the latter are filled to hold said valves in positions in which they permit flow of the fluid medium through said passages, said inlet chambers being formed with openings through which air may be released to bleed said system and threaded elements for closing said openings.

4. A hydraulic brake system for a motor vehicle including a master cylinder, separate lines leading to the front and rear brakes of said vehicle, a pair of control devices, each having an inlet chamber which communicates with said master cylinder and a reservoir which is located under said inlet chamber and to which one of said lines is connected, passages connecting said inlet chambers and reservoirs, seats formed at the bottoms of said inlet chambers, valves which are movable into engagement with said seats to cut off communication between said inlet chambers and reservoirs and floats in said reservoirs which are operative when the latter are filled to hold said valves in positions in which they permit flow of the fluid medium through said passages.

5. A hydraulic brake system for a motor vehicle including a master cylinder, separate lines leading to the front and rear brakes of said vehicle, a pair of control devices, each having an inlet chamber which communicates with said master cylinder and a reservoir which is located under said inlet chamber and to which one of said lines is connected, passages connecting said inlet chambers and reservoirs, seats formed at the bottoms of said inlet chambers, valves which are movable into engagement with said seats to cut off communication between said inlet chambers and reservoirs and floats in said reservoirs which carry stems which extend through said passages into cooperating relation with said valves and which are operative when said reservoirs are filled to hold said valves in positions in which they permit flow of the fluid medium through said passages.

6. A hydraulic brake system for a motor vehicle including a master cylinder, separate lines leading to the front and rear brakes of said vehicle, a pair of control devices, each having an inlet chamber which communicates with said master cylinder and a reservoir which is located under and which communicates with said inlet chamber, seats formed at the bottoms of said inlet chambers, valves which are movable to engage said seats to cut off communication between said inlet chambers and reservoirs, floats in said reservoirs which are operative when the latter are filled to hold said valves in positions in which they permit flow of the fluid medium into said reservoirs, said reservoirs having outlets in their bottom walls through which the fluid medium flows into said lines and seats at the bottoms of said reservoirs for floats, said seats being formed to permit passage of the fluid medium into said lines when said floats rest upon them.

7. A hydraulic brake system for a motor vehicle including a master cylinder, separate lines leading to the front and rear brakes of said vehicle, a pair of control devices, each having an inlet chamber which communicates with said master cylinder and a reservoir which is located under said inlet chamber, passages connecting said inlet chambers and reservoirs, seats formed at the bottoms of said inlet chambers, valves which are movable to engage said seats to cut off communication between said inlet chambers and reservoirs, floats in said reservoirs which carry stems which extend through said passages into cooperating relation with said valves and which are operative when said reservoirs are filled to hold said valves in positions in which they permit flow of the fluid medium through said passages, said reservoirs having openings in their bottom walls through which the fluid medium flows into said lines and seats at the bottoms of said reservoirs for said floats, said seats being formed to permit passage of the fluid medium into said lines when said floats rest upon them.

CARL T. DE GRACE.